(12) United States Patent
Hanita et al.

(10) Patent No.: US 9,202,106 B2
(45) Date of Patent: Dec. 1, 2015

(54) EYELID DETECTION DEVICE

(75) Inventors: Kiyoto Hanita, Susono (JP); Yoshinao Takemae, Yokohama (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 55 days.

(21) Appl. No.: 14/131,531

(22) PCT Filed: Jul. 11, 2011

(86) PCT No.: PCT/JP2011/065825
§ 371 (c)(1),
(2), (4) Date: Jan. 8, 2014

(87) PCT Pub. No.: WO2013/008305
PCT Pub. Date: Jan. 17, 2013

(65) Prior Publication Data
US 2014/0140577 A1 May 22, 2014

(51) Int. Cl.
*G06K 9/00* (2006.01)
*G06T 7/00* (2006.01)

(52) U.S. Cl.
CPC ........ *G06K 9/00228* (2013.01); *G06K 9/00604* (2013.01); *G06K 9/00845* (2013.01); *G06T 7/0046* (2013.01); *G06T 2207/30201* (2013.01)

(58) Field of Classification Search
CPC ........ A61B 5/18; A61B 3/113; A61B 5/1103; A61B 5/6821; A61B 5/4809; G06K 9/00597; G06K 9/0061; G06K 9/00268; G06K 9/58
USPC ......................................... 382/103
See application file for complete search history.

(56) References Cited

U.S. PATENT DOCUMENTS

| | | | |
|---|---|---|---|
| 5,573,006 A * | 11/1996 | Shimotani et al. | 600/558 |
| 6,664,956 B1 * | 12/2003 | Erdem | 345/419 |
| 2003/0118217 A1 * | 6/2003 | Kondo et al. | 382/117 |
| 2006/0210121 A1 * | 9/2006 | Nakano et al. | 382/117 |
| 2007/0127787 A1 * | 6/2007 | Castleman et al. | 382/118 |
| 2008/0151186 A1 * | 6/2008 | Adachi et al. | 351/206 |

(Continued)

FOREIGN PATENT DOCUMENTS

| | | |
|---|---|---|
| JP | 2005 78311 | 3/2005 |
| JP | 2009 245338 | 10/2009 |
| JP | 2011 125620 | 6/2011 |

OTHER PUBLICATIONS

International Search Report Issued Oct. 18, 2011 in PCT/JP11/065825 filed Jul. 11, 2011.

*Primary Examiner* — Nirav G Patel
*Assistant Examiner* — Shaghayegh Azima
(74) *Attorney, Agent, or Firm* — Oblon, McClelland, Maier & Neustadt, L.L.P.

(57) ABSTRACT

An ECU 30 includes a face position and face feature point detection unit 32 that detects the feature points of the face of the driver, a face pose estimation unit 33 that fits the feature points of the face detected by the face position and face feature point detection unit 32 to a 3D face model to estimate the direction of the face of the driver, an eyelid range setting unit 34 that sets an upper eyelid presence range and a lower eyelid presence range including the positions of the upper and lower eyelids on the basis of the pose of the face estimated by the face pose estimation unit 33, and an eyelid detection unit 35 that detects the positions of the upper and lower eyelids in the upper eyelid presence range and the lower eyelid presence range set by the eyelid range setting unit 34.

3 Claims, 10 Drawing Sheets

(56) References Cited

U.S. PATENT DOCUMENTS

| | | | |
|---|---|---|---|
| 2008/0212828 A1* | 9/2008 | Ishida et al. | 382/100 |
| 2008/0212850 A1* | 9/2008 | Adachi et al. | 382/118 |
| 2008/0238694 A1* | 10/2008 | Ishida | 340/575 |
| 2009/0109400 A1* | 4/2009 | Yoshinaga et al. | 351/210 |
| 2010/0014759 A1* | 1/2010 | Suzuki et al. | 382/195 |
| 2010/0027890 A1* | 2/2010 | Yoshinaga et al. | 382/195 |
| 2013/0021462 A1* | 1/2013 | Kadoya et al. | 348/78 |
| 2014/0037144 A1* | 2/2014 | Hiramaki | 382/103 |
| 2014/0072230 A1* | 3/2014 | Ruan et al. | 382/199 |

* cited by examiner

Fig.10
(a) 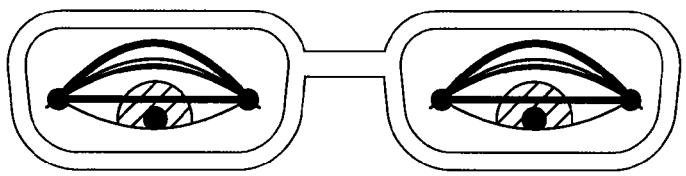
(b) 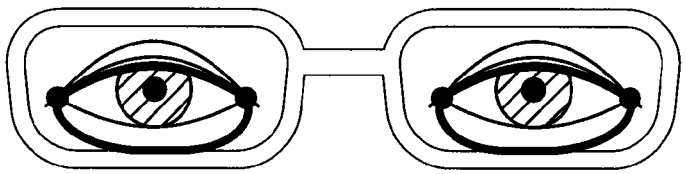
(c) 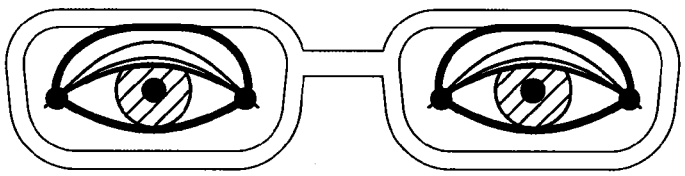

EYELID DETECTION DEVICE

TECHNICAL FIELD

The present invention relates to an eyelid detection technique that detects the positions of the upper and lower eyelids from a face image.

BACKGROUND ART

A technique has been known which detects the positions of the upper and lower eyelids from a face image in order to detect, for example, an eye opening state (for example, see Patent Literature 1). Patent Literature 1 discloses a technique that detects the opening and closing state of the eyes on the basis of the shape of the eyelids corresponding to a stored face pose and the detected shape of the eyelids.

CITATION LIST

Patent Literature

[Patent Literature 1] Japanese Unexamined Patent Application Publication No. 2005-078311

SUMMARY OF INVENTION

Technical Problem

However, the technique disclosed in Patent Literature 1 has the problem that it is impossible to accurately detect the eyelids due to a red-eye phenomenon or disturbance caused by, for example, glasses. For example, an edge is generated in the vicinity of a red eye and is likely to be falsely detected as the positions of the upper and lower eyelids. In addition, when the edge of the frames of the glasses is enhanced in the face image, the frames of the glasses are likely to be falsely detected as the positions of the upper and lower eyelids.

An object of the invention is to provide an eyelid detection device that can detect the positions of the upper and lower eyelids with high accuracy even when a red-eye phenomenon or disturbance caused by, for example, glasses occurs.

Solution to Problem

According to the invention, there is provided an eyelid detection device that detects positions of upper and lower eyelids from a face image. The eyelid detection device detects the positions of the upper and lower eyelids on the basis of a direction of a face that is estimated by fitting feature points of the face detected from the face image to a three-dimensional face model.

According to the eyelid detection device of the invention, the feature points of the face are fitted to the three-dimensional face model to estimate the direction of the face. The ranges in which the upper and lower eyelids are present are limited on the basis of the direction of the face. Therefore, when the positions of the upper and lower eyelids are detected on the basis of the estimated direction of the face, it is possible to detect the positions of the upper and lower eyelids only from the ranges in which the upper and lower eyelids are present. It is possible to exclude the influence of the red-eye phenomenon which occurs in the range in which the upper and lower eyelids are absent or disturbance caused by glasses. As a result, it is possible to detect the positions of the upper and lower eyelids with high accuracy.

An upper and lower eyelid curve model which is estimated from the direction of the face may be fitted to an edge image in which an edge of the face image is enhanced to detect the positions of the upper and lower eyelids. As such, since the upper and lower eyelid curve model which is estimated from the direction of the face is fitted to the edge image, it is possible to appropriately detect the positions of the upper and lower eyelids.

A detection angle range of the upper and lower eyelids in an up-down direction may be limited on the basis of the direction of the face during driving. Since the driver looks to the front, regardless of the direction of the face, during driving, the ranges in which the upper and lower eyelids are present are specified. Therefore, when the detection angle range of the upper and lower eyelids in the up-down direction is limited on the basis of the direction of the face during driving, it is possible to appropriately exclude the influence of the red-eye phenomenon which occurs in the range in which the upper and lower eyelids are absent or disturbance caused by glasses.

In this case, when the direction of the face is an upward direction, an upper limit angle of the upper eyelid may be less than that when the direction of the face is a front direction. As such, when the direction of the face is the upward direction, the driver is likely to look down. Therefore, in this case, if the upper limit angle of the upper eyelid is less than that when the direction of the face is the front direction, it is possible to appropriately exclude the influence of the red-eye phenomenon which occurs in the range in which the upper and lower eyelids are absent or disturbance caused by glasses.

When the direction of the face is a downward direction, a lower limit angle of the upper and lower eyelids may be more than that when the direction of the face is a front direction. As such, when the direction of the face is the downward direction, the driver is likely to look up. Therefore, in this case, if the lower limit angle of the upper and lower eyelids is more than that when the direction of the face is the front direction, it is possible to appropriately exclude the influence of the red-eye phenomenon which occurs in the range in which the upper and lower eyelids are absent or disturbance caused by glasses.

Advantageous Effects of Invention

According to the invention, it is possible to detect the positions of the upper and lower eyelids with high accuracy even when a red-eye phenomenon or disturbance caused by, for example, glasses occurs.

BRIEF DESCRIPTION OF DRAWINGS

FIG. 10 is a diagram illustrating the outline of an error in the detection of the positions of the upper and lower eyelids.

DESCRIPTION OF EMBODIMENTS

Figure 1:
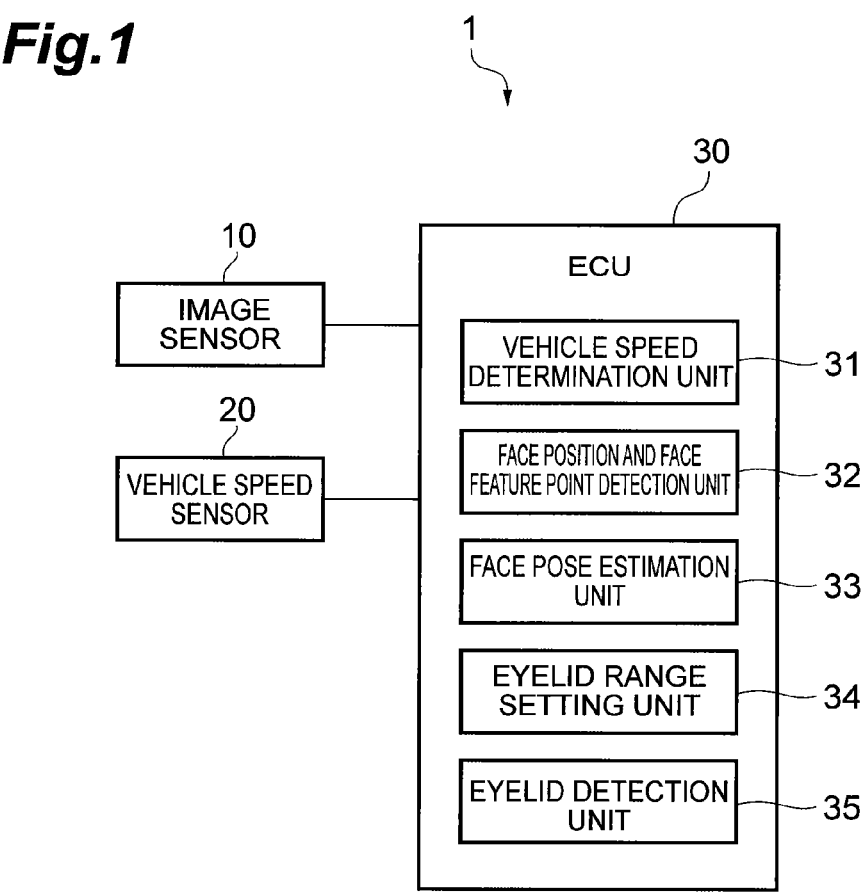
FIG. 1 is a block diagram illustrating the structure of an eyelid detection device according to an embodiment.

Hereinafter, an eyelid detection device according to an embodiment of the invention will be described. In the drawings, the same or equivalent components are denoted by the same reference numerals and the description thereof will not be repeated.

The eyelid detection device according to this embodiment is provided in, for example, a driving support control device which estimates the degree of drowsiness of the driver from the degree of eye opening which is calculated from the positions of the upper and lower eyelids and performs vehicle driving support control. The positions of the upper and lower eyelids mean the position of the upper eyelid and the position of the lower eyelid.

FIG. 1 is a block diagram illustrating the structure of the eyelid detection device according to the embodiment. As shown in FIG. 1, an eyelid detection device 1 according to the embodiment includes an image sensor 10, a vehicle speed sensor 20, and an electronic control unit (ECU) 30.

The image sensor 10 captures the image of the face of the driver. For example, a CCD camera which is fixed to a steering column of the vehicle is used as the image sensor 10. The image (face image) captured by the image sensor 10 includes image information indicating, for example, the position or color information of each pixel. The image sensor 10 outputs the image information of the captured image to the ECU 30.

The vehicle speed sensor 20 measures the speed of the vehicle. The vehicle speed sensor 20 measures, for example, the rotation speed of each wheel of the vehicle to measure the speed of the vehicle. Then, the vehicle speed sensor 20 outputs the measured vehicle speed to the ECU 30.

The ECU 30 is a computer of a vehicle device which performs electronic control and includes, for example, a central processing unit (CPU), a memory, such as a read only memory (ROM) or a random access memory (RAM), and an input/output interface.

The ECU 30 is connected to the image sensor 10 and the vehicle speed sensor 20 and includes a vehicle speed determination unit 31, a face position and face feature point detection unit 32, a face pose estimation unit 33, an eyelid range setting unit 34, and an eyelid detection unit 35.

The vehicle speed determination unit 31 has a function of determining whether the vehicle is traveling. For example, when the vehicle speed output from the vehicle speed sensor 20 is higher than 0 km/h, the vehicle speed determination unit 31 determines that the vehicle is traveling.

The face position and face feature point detection unit 32 has a function of detecting the feature points of the face of the driver from the image captured by the image sensor 10. Specifically, first, the face position and face feature point detection unit 32 searches for the position of the face in the entire range of the image captured by the image sensor 10 using a statistical method, such as a neural network method or a boosting method. Then, the face position and face feature point detection unit 32 sets a face position region including the searched position of the face and detects the feature points of the face from the set face position region using the statistical method, such as the neural network method or the boosting method. The feature points of the face include, for example, the outer corner of the right eye, the inner corner of the right eye, the outer corner of the left eye, the inner corner of the left eye, the center of the nasal cavity, and the left and right ends of the mouth. In addition, a method of detecting each feature point of the face is not limited to the above-mentioned method, but other known methods may be used.

The face pose estimation unit 33 has a function of estimating the pose (direction) of the face of the driver from the feature points of the face detected by the face position and face feature point detection unit 32. Specifically, first, the face pose estimation unit 33 fits a three-dimensional face model (3D face model) to the coordinate positions of the feature points of the face detected by the face position and face feature point detection unit 32. Then, the face pose estimation unit 33 estimates the pose (direction) of the face of the driver from the pose of the fitted 3D face model. The 3D face model includes a three-dimensional eye model and can indicate, for example, the view direction of the three-dimensional eye model or the positions of the upper and lower eyelids covering the three-dimensional eye model.

The eyelid range setting unit 34 has a function of setting an upper eyelid presence range in which the upper eyelid is present and a lower eyelid presence range in which the lower eyelid is present, on the basis of the pose of the face estimated by the face pose estimation unit 33. It is considered that, during driving, the driver looks to the front regardless of the angle of the direction of the face in the up-down direction. Therefore, during driving, the upper eyelid presence range and the lower eyelid presence range are specified on the basis of the angle of the direction of the face in the up-down direction. In addition, when the driver looks up or down during driving, the opening angle of the eyelid is less than that when the driver looks to the front. Therefore, the eyelid range setting unit 34 sets the upper eyelid presence range and the lower eyelid presence range on the basis of the pose (direction) of the face estimated by the face pose estimation unit 33. The upper eyelid presence range and the lower eyelid presence range are represented by angular ranges in the three-dimensional eye model. The eyelid range setting unit 34 projects the upper eyelid presence range and the lower eyelid presence range which are represented by the angular ranges in the three-dimensional eye model to the two-dimensional face position region set by the face position and face feature point detection unit 32, thereby setting the two-dimensional upper and lower eyelid presence ranges to the face position region.

The eyelid detection unit 35 has a function of detecting the positions of the upper and lower eyelids in the upper and lower eyelid presence ranges set by the eyelid range setting unit 34. Specifically, the eyelid detection unit 35 applies, for example, a Sobel filter to the face position region set by the face position and face feature point detection unit 32 to generate an edge image which is an edge-enhanced image. In addition, the eyelid detection unit 35 projects a plurality of curves which have the feature points, such as the outer corner of the eye and the inner corner of the eye detected by the face position and face feature point detection unit 32, as a starting point and an end point to the edge image in the upper eyelid presence range and the lower eyelid presence range set by the eyelid range setting unit 34. Then, the eyelid detection unit 35 detects the positions of the upper and lower eyelids from the strength of the edge (the pixel value of the edge image) on the curves. That is, the eyelid detection unit 35 fits the plurality of curves (the curve models of the upper and lower eyelids) projected to the upper eyelid presence range and the lower eyelid presence range to the edge image to detect the positions of the upper and lower eyelids. A method of detecting the positions of the upper and lower eyelids is not limited to the above-mentioned method, but other known methods may be used.

Figure 2:
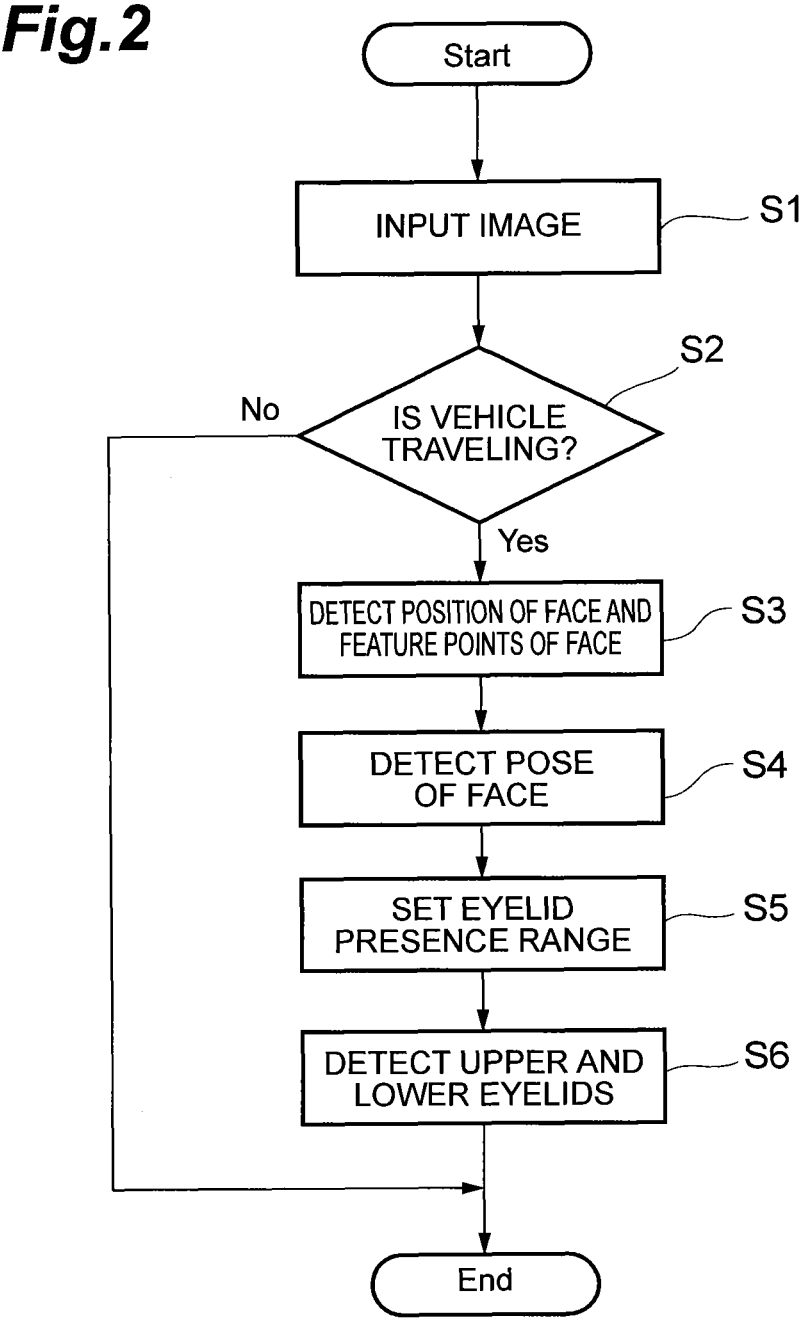
FIG. 2 is a flowchart illustrating a red-eye detection process of the eyelid detection device according to the embodiment.

Next, the operation of the eyelid detection device 1 according to the embodiment will be described. FIG. 2 is a flowchart illustrating an eyelid detection process of the eyelid detection device according to the embodiment. The process shown in FIG. 2 is performed under the control of the ECU 30. For example, the process is repeatedly performed at a predetermined interval for the period from the time when an ignition is turned on to the time when the ignition is turned off.

Figure 3:
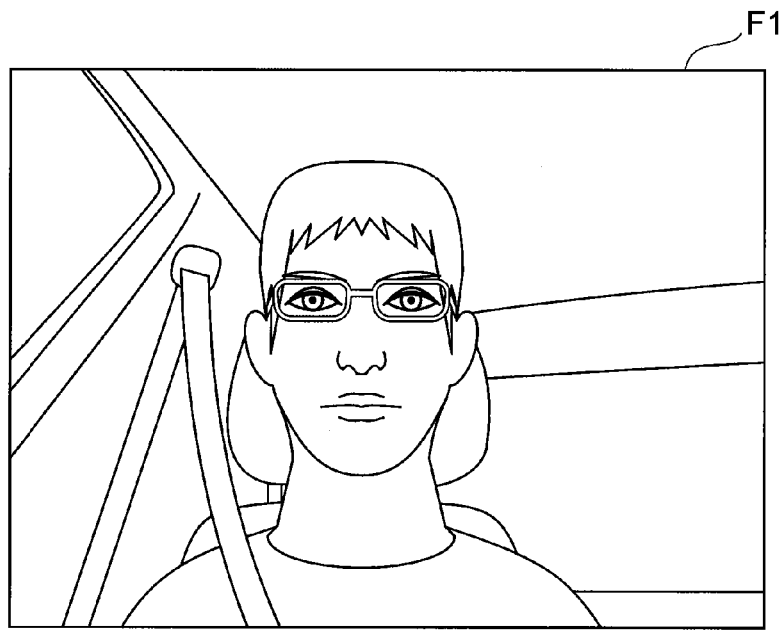
FIG. 3 is a diagram illustrating an example of image information captured by an image sensor.

As shown in FIG. 2, first, the ECU 30 inputs the image of the driver captured by the image sensor 10 (Step S1). In Step S1, the ECU 30 inputs an image F1 shown in FIG. 3 which is captured by the image sensor 10. FIG. 3 shows an example of the image captured by the image sensor.

Then, the ECU 30 determines whether the vehicle is traveling (Step S2). The process in Step S2 is performed by the vehicle speed determination unit 31. The vehicle speed determination unit 31 determines that the vehicle is traveling when the vehicle speed output from the vehicle speed sensor 20 is higher than 0 km/h and determines that the vehicle is not traveling when the vehicle speed output from the vehicle speed sensor 20 is 0 km/h.

Then, when it is determined that the vehicle is not traveling (Step S2: NO), the ECU 30 ends the eyelid detection process.

Figure 4:
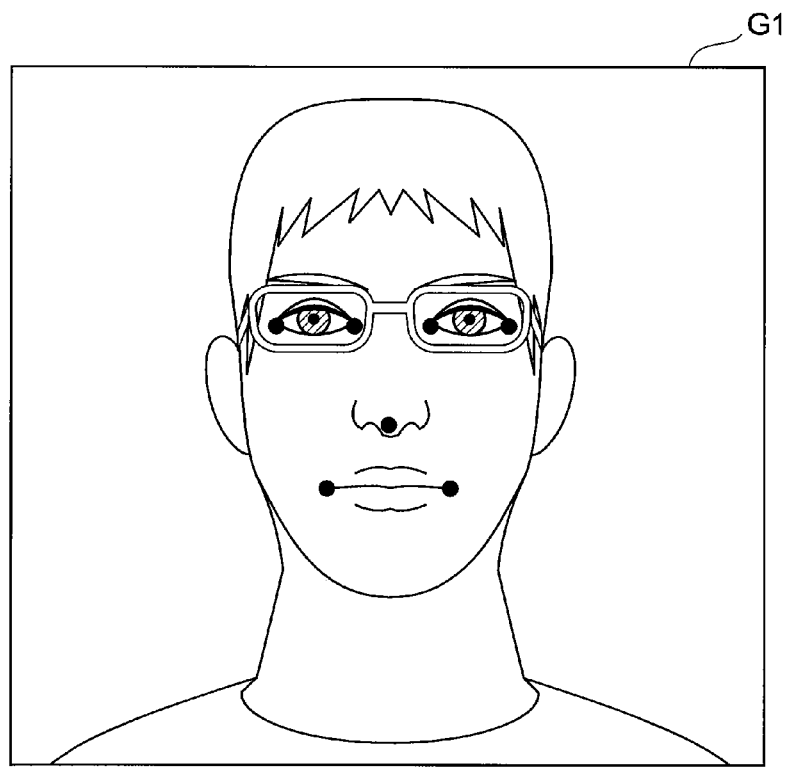
FIG. 4 is a diagram illustrating an example of a face position region.

On the other hand, when it is determined that the vehicle is traveling (Step S2: YES), the ECU 30 detects the position of the face and the feature points of the face (Step S3). The process in Step S3 is performed by the face position and face feature point detection unit 32. The face position and face feature point detection unit 32 searches for the position of the face in the entire range of the image F1 input in Step S1 using the statistical method, such as the neural network method or the boosting method. Then, the face position and face feature point detection unit 32 sets a face position region G1. FIG. 4 is a diagram illustrating the outline of a face feature point detection method and shows the face position region G1. As shown in FIG. 4, the face position region G1 includes the searched position of the face and is a region of the image F1. Then, the face position and face feature point detection unit 32 detects the feature points, such as the outer corner of the right eye, the inner corner of the right eye, the outer corner of the left eye, the inner corner of the left eye, the center of the nasal cavity, and the left and right ends of the mouth in the set face position region G1 as a search range, using the statistical method, such as the neural network method or the boosting method.

Then, the ECU 30 estimates the pose (direction) of the face of the driver from the feature points of the face which are detected in Step S3 (Step S4). Step S4 is performed by the face pose estimation unit 33. First, the face pose estimation unit 33 fits the 3D face model to the coordinate positions of the feature points of the face detected by face position and face feature point detection unit 32 in Step S3.

Figure 5:
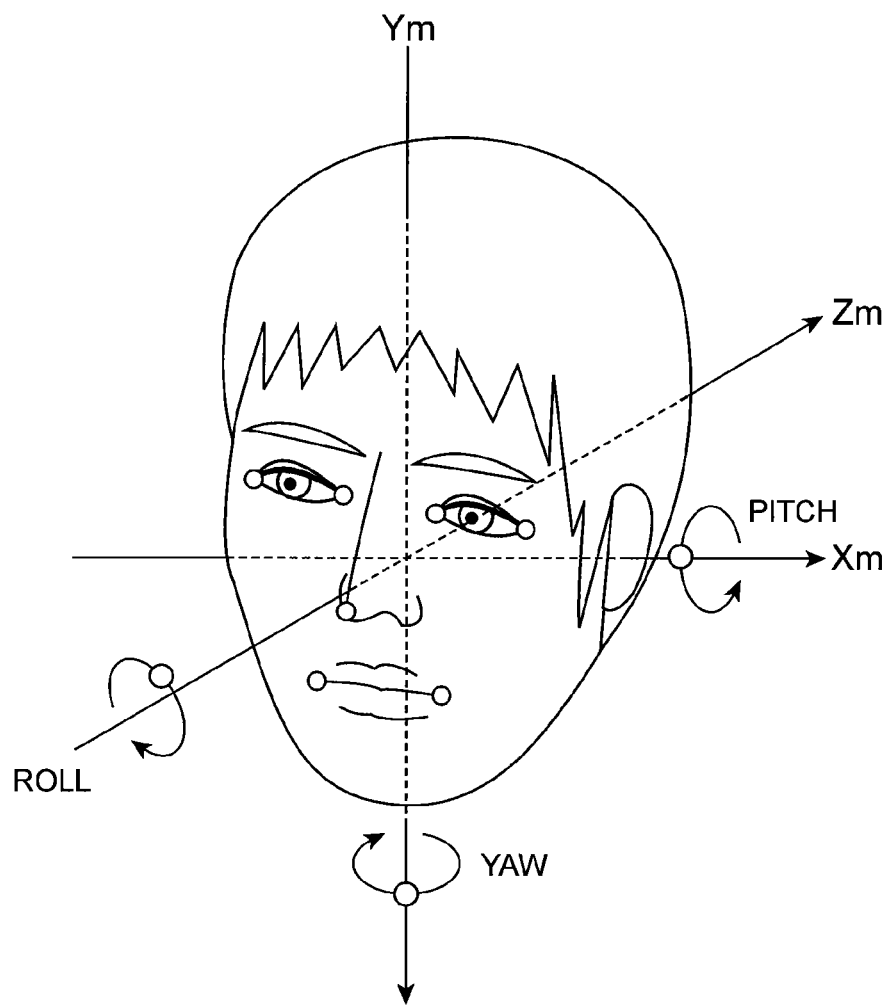
FIG. 5 is a diagram illustrating an example of the outline of a 3D face model.

FIG. 5 is a diagram illustrating an example of the outline of the 3D face model. As shown in FIG. 5, in the 3D face model, the up-down direction of the face is a Ym direction, the left-right direction of the face is an Xm direction, the front-back direction of the face is a Zm direction, a rotation about the Ym axis is a yaw, a rotation about the Xm axis is a pitch, and a rotation about the Zm axis is a roll. Therefore, the 3D face model has a distance from the rotation center of the head for each feature point. The face pose estimation unit 33 fits the 3D face model to the feature points of the face and sets the position and rotation (yaw, pitch, and roll) which are best matched with each other as the pose of the face at that time. A method of estimating the pose of the face is not limited thereto, but other known methods may be used. Then, the face pose estimation unit 33 estimates the pose (direction) of the face of the driver from the pose of the fitted 3D face model.

Then, the ECU 30 sets the upper eyelid presence range and the lower eyelid presence range on the basis of the pose (direction) of the face estimated in Step S3 (Step S5). Step S5 is performed by the eyelid range setting unit 34. First, the eyelid range setting unit 34 sets the upper eyelid presence range and the lower eyelid presence range which are represented by angular ranges in the three-dimensional eye model, on the basis of the direction of the face which is estimated by the face pose estimation unit 33 in Step S3.

Figure 6:
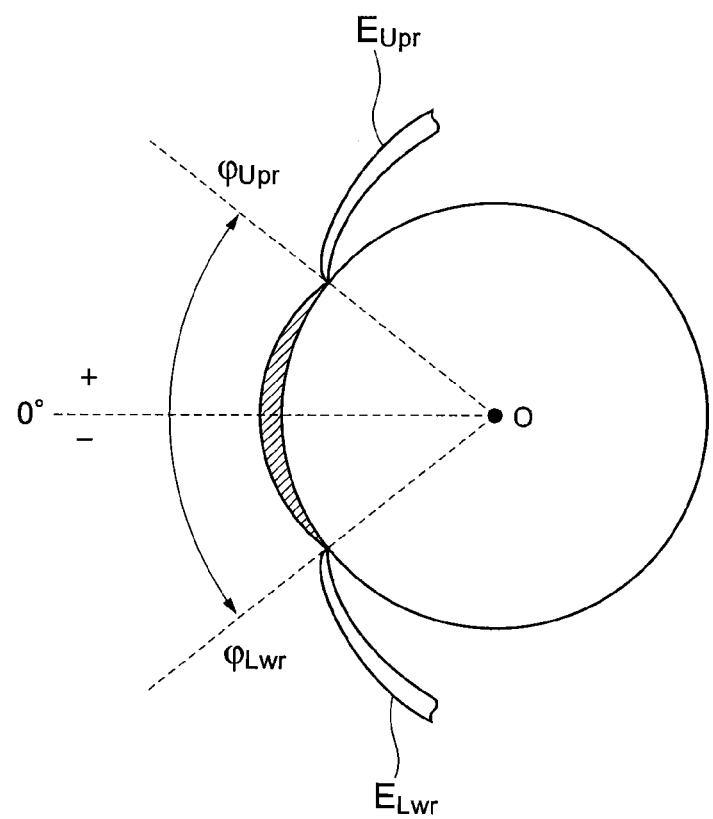
FIG. 6 is a diagram illustrating a three-dimensional eye model when the direction of the face is the front direction.
Figure 7:
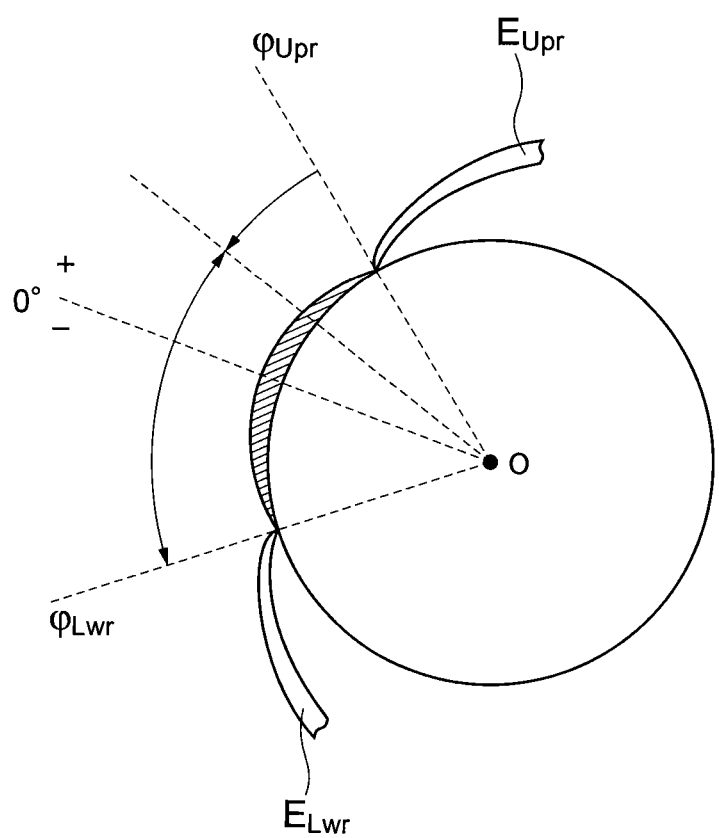
FIG. 7 is a diagram illustrating a three-dimensional eye model when the direction of the face is the upward direction.
Figure 8:
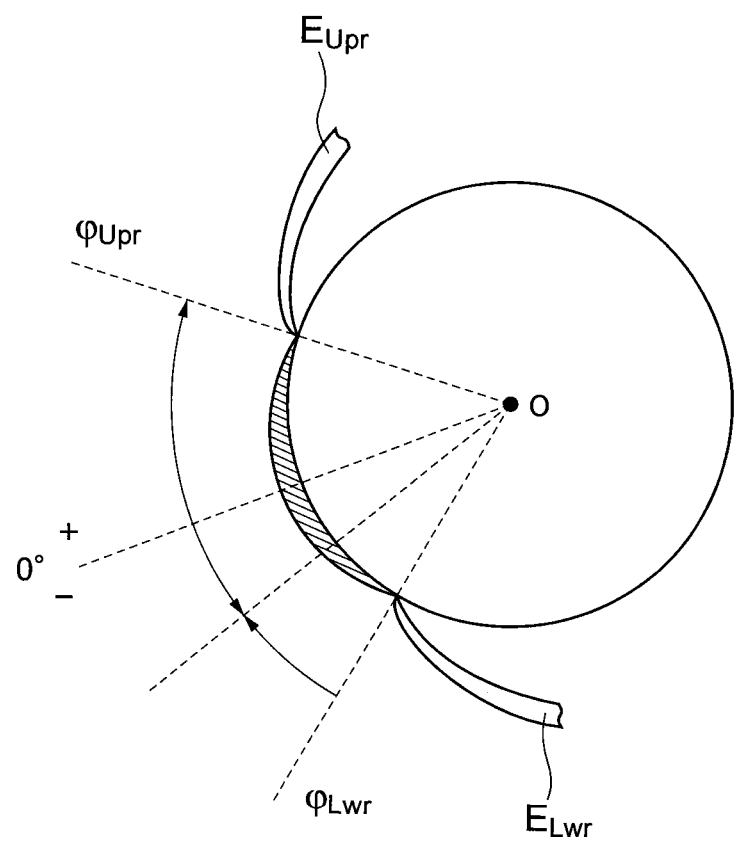
FIG. 8 is a diagram illustrating a three-dimensional eye model when the direction of the face is the downward direction.

Next, an example of the setting of the upper eyelid presence range and the lower eyelid presence range will be described with reference to FIGS. 6 to 8. FIG. 6 is a diagram illustrating the three-dimensional eye model when the direction of the face is the front direction. FIG. 7 is a diagram illustrating the three-dimensional eye model when the direction of the face is the upward direction. FIG. 8 is a diagram illustrating the three-dimensional eye model when the direction of the face is the downward direction. In FIGS. 6 to 8, O indicates the center of the eyeball in the three-dimensional eye model, $E_{Upr}$ indicates the upper eyelid, $E_{Lwr}$ indicates the lower eyelid, $\phi_{Upr}$ indicates the position of the upper eyelid, and $\phi_{Lwr}$ indicates the position of the lower eyelid. The following upper and lower eyelid presence ranges are illustrative examples and other values may be used.

First, the eyelid range setting unit 34 determines whether the direction of the face which is estimated by the face pose estimation unit 33 in Step S3 is the front direction, the upward direction, or the downward direction. In the determination, assuming that, when the driver looks straight forward, the angle of the direction of the face with respect to the up-down direction is 0°, a case in which the angle of the direction of the face with respect to the up-down direction is equal to or more than −10° and equal to or less than 10° is determined to be the front direction, a case in which the angle of the direction of the face with respect to the up-down direction is more than 10° is determined to be the upward direction, and a case in which the angle of the direction of the face with respect to the up-down direction is less than −10° is determined to be the downward direction.

When it is determined that the direction of the face is the front direction, the eyelid range setting unit 34 sets the upper eyelid presence range including the position $\phi_{Upr}$ of the upper eyelid to be equal to or more than −45° and equal to or less than 55° ($-45° \leq \phi_{Upr} \leq 55°$) and sets the lower eyelid presence range including the position $\phi_{Lwr}$ of the lower eyelid to be equal to or more than −45° and equal to less than −15° ($-45° \leq \phi_{Lwr} \leq -15°$), as shown in FIG. 6.

When it is determined that the direction of the face is the upward direction, the eyelid range setting unit 34 sets the upper eyelid presence range including the position $\phi_{Upr}$ of the upper eyelid to be equal to or more than −45° and equal to or less than 30° ($-45° \leq \phi_{Upr} \leq 30°$) and sets the lower eyelid presence range including the position $\phi_{Lwr}$ of the lower eyelid to be equal to or more than −45° and equal to or less than −15° ($-45° \phi_{Lwr} \leq -15°$), as shown in FIG. 7. That is, when it is determined that the direction of the face is the upward direction, the upper limit angle of the upper eyelid presence range is 25° less than that when it is determined that the direction of the face is the front direction.

When it is determined that the direction of the face is the downward direction, the eyelid range setting unit 34 sets the upper eyelid presence range including the position $\phi_{Upr}$ of the upper eyelid to be equal to or more than −30° and equal to or less than 55° ($-30° \leq \phi_{Upr} \leq 55°$) and sets the lower eyelid presence range including the position $\phi_{Lwr}$ of the lower eyelid to be equal to or more than −30° and equal to less than −15° (−30°≤φ$_{Lwr}$≤−15°, as shown in FIG. 8. That is, when it is determined that the direction of the face is the downward direction, the lower limit angle of the upper and lower eyelid presence ranges is 15° more than that when it is determined that the direction of the face is the front direction.

When the upper eyelid presence range and the lower eyelid presence range corresponding to the direction of the face are set in this way, the eyelid range setting unit 34 projects the upper eyelid presence range and the lower eyelid presence range which are represented by the angular ranges in the three-dimensional eye model to the two-dimensional face position region which is set by the face position and face feature point detection unit 32 in Step S3 to set the upper eyelid presence range and the lower eyelid presence range in the face position region.

Then, the ECU 30 detects the position of the upper eyelid and the position of the lower eyelid in the upper eyelid presence range and the lower eyelid presence range which are set by the eyelid range setting unit 34 in Step S5 (Step S6). The process in Step S6 is performed by the eyelid detection unit 35.

Figure 9:
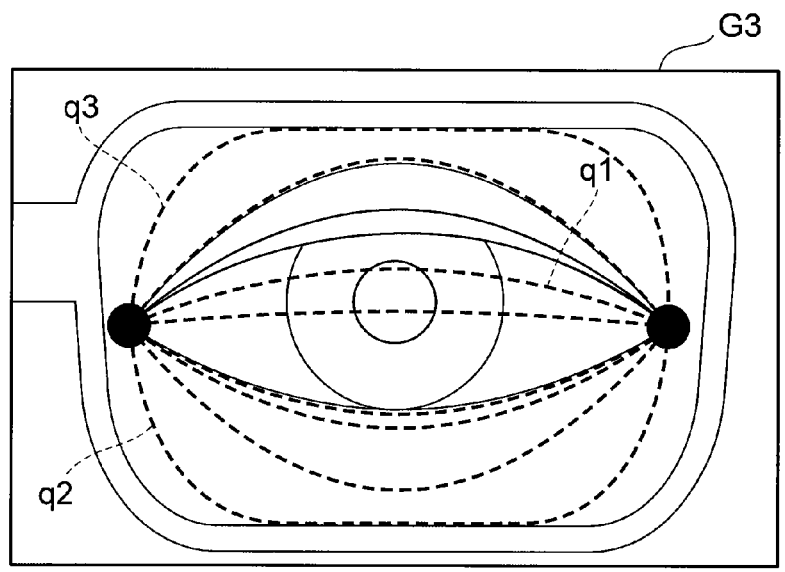
FIG. 9 is a diagram illustrating the outline of a method of detecting the upper and lower eyelids.

Next, a method of detecting the upper and lower eyelids in Step S4 will be described with reference to FIG. 9. FIG. 9 is a diagram illustrating the outline of the method of detecting the upper and lower eyelids. As shown in FIG. 9, the eyelid detection unit 35 applies, for example, the Sobel filter to the face position region G1 which is set by the face position and face feature point detection unit 32 in Step S3 to generate an edge image G3 which is an edge-enhanced image. Then, the eyelid detection unit 35 projects a plurality of curves which have the feature points, such as the outer corner of the eye and the inner corner of the eye detected in Step S3, as a starting point and an end point in the upper eyelid presence range and the lower eyelid presence range which are set by the eyelid range setting unit 34 in Step S5. For example, a Bezier curve is used as the curve. Then, the eyelid detection unit 35 projects a curve as a lower eyelid candidate only to the lower eyelid presence range set by the eyelid range setting unit 34 and projects a curve as an upper eyelid candidate only to the upper eyelid presence range set by the eyelid range setting unit 34. That is, the eyelid detection unit 35 does not project the curve as the lower eyelid candidate beyond the lower eyelid presence range set by the eyelid range setting unit 34 and does not project the curve as the upper eyelid candidate beyond the upper eyelid presence range set by the eyelid range setting unit 34. For example, since a curve q1 shown in FIG. 9 is disposed above the lower eyelid presence range set by the eyelid range setting unit 34, it is not projected as the lower eyelid candidate. In addition, since a curve q2 shown in FIG. 9 is disposed below the upper eyelid presence range and the lower eyelid presence range set by the eyelid range setting unit 34, it is not projected as the upper eyelid candidate and the lower eyelid candidate. Since a curve q3 shown in FIG. 9 is disposed above the upper eyelid presence range and the lower eyelid presence range set by the eyelid range setting unit 34, it is not projected as the upper eyelid candidate and the lower eyelid candidate.

When a plurality of curves are projected to the edge image G3 in this way, the eyelid detection unit 35 calculates the strength of the edge (the pixel value of the edge image) on the curves and detects the curves with strong edge strength as an upper eyelid curve indicating the position of the upper eyelid and a lower eyelid curve indicating the position of the lower eyelid. Then, the eyelid detection process ends.

Next, a case in which the eyelid range setting unit 34 does not set the upper eyelid presence range and the lower eyelid presence range and the eyelid detection unit 35 detects the positions of the upper and lower eyelids will be described with reference to FIG. 10. FIG. 10 is a diagram illustrating the outline of an error in the detection of the positions of the upper and lower eyelids. As shown in FIG. 10(a), when a red-eye phenomenon occurs at night, an unnecessary edge is generated in the vicinity of the red eye. The unnecessary edge which is generated in the vicinity of the red eye is likely to be falsely detected as the positions of the upper and lower eyelids. As shown in FIGS. 10(b) and 10(c), when the driver wears glasses, the edge of the frames of the glasses is enhanced. Therefore, in some cases, the frames of the glasses are falsely detected as the positions of the upper and lower eyelids.

However, in this embodiment, the eyelid detection unit 35 detects the positions of the upper and lower eyelids in the upper eyelid presence range and the lower eyelid presence range set by the eyelid range setting unit 34. Therefore, it is possible to prevent errors in the detection of the positions of the upper and lower eyelids shown in FIG. 10. For example, since the curve q1 shown in FIG. 9 is disposed above the lower eyelid presence range set by the eyelid range setting unit 34, it is not projected as the lower eyelid candidate. Therefore, an unnecessary edge which is generated in the vicinity of the red eye is not falsely detected as the positions of the upper and lower eyelids, unlike FIG. 10(a). Since the curve q2 shown in FIG. 9 is disposed below the lower eyelid presence range set by the eyelid range setting unit 34, it is not projected as the lower eyelid candidate. Therefore, the lower frames of the glasses are not falsely detected as the position of the lower eyelid, unlike FIG. 10(b). Since the curve q3 shown in FIG. 9 is disposed above the upper eyelid presence range set by the eyelid range setting unit 34, it is not projected as the upper eyelid candidate. Therefore, the upper frames of the glasses are not falsely detected as the position of the upper eyelid, unlike FIG. 10(c).

As described above, according to the eyelid detection device 1 of this embodiment, during driving, the upper and lower eyelid presence ranges in which the upper and lower eyelids are present are set on the basis of the direction of the face, and the positions of the upper and lower eyelids are detected in the set upper and lower eyelid presence ranges. Therefore, it is possible to exclude the influence of the red-eye phenomenon which occurs in the range in which the upper and lower eyelids are absent or disturbance caused by glasses. As a result, it is possible to detect the positions of the upper and lower eyelids with high accuracy.

The curves, which are the candidates of the upper and lower eyelids, are fitted to the edge image in the upper eyelid presence range and the lower eyelid presence range. Therefore, it is possible to appropriately detect the positions of the upper and lower eyelids.

When the direction of the face is the upward direction, the upper limit angle of the upper eyelid in the upper eyelid presence range is less than that when the direction of the face is the front direction. When the direction of the face is the downward direction, the lower limit angle of the upper and lower eyelids in the upper eyelid presence range and the lower eyelid presence range is more than that when the direction of the face is the front direction. Therefore, it is possible to appropriately exclude the influence of the red-eye phenomenon which occurs in the range in which the upper and lower eyelids are absent or disturbance caused by glasses.

The exemplary embodiment of the invention has been described above. However, the invention is not limited to the above-described embodiment. For example, in the above-described embodiment, the eyelid range setting unit 34 sets the upper eyelid presence range and the lower eyelid presence range and the eyelid detection unit 35 detects the positions of the upper and lower eyelids from the upper eyelid presence range and the lower eyelid presence range. However, any means may be used to detect the positions of the upper and lower eyelids as long as it can detect the positions of the upper and lower eyelids on the basis of the direction of the face. For example, the upper eyelid presence range and the lower eyelid presence range may not be set, the ranges in which the upper and lower eyelids are present in the edge image may be calculated from the direction of the face, and curves, which are the candidates of the upper and lower eyelids, may be projected in the calculated range.

In the above-described embodiment, the eyelid range setting unit 34 sets the upper eyelid presence range and the lower eyelid presence range which are represented by the angular ranges in the three-dimensional eye model and then sets the two-dimensional upper and lower eyelid presence ranges to the face position region. However, the two-dimensional upper and lower eyelid presence ranges may be directly set to the face position region.

INDUSTRIAL APPLICABILITY

The invention can be used as an eyelid detection device that detects the positions of the upper and lower eyelids from a face image.

REFERENCE SIGNS LIST

1: EYELID DETECTION DEVICE
10: IMAGE SENSOR
20: VEHICLE SPEED SENSOR
30: ECU
31: VEHICLE SPEED DETERMINATION UNIT
32: FACE POSITION AND FACE FEATURE POINT DETECTION UNIT
33: FACE POSE ESTIMATION UNIT
34: EYELID RANGE SETTING UNIT
35: EYELID DETECTION UNIT
F1: IMAGE
G1: FACE POSITION REGION
G3: EDGE IMAGE

The invention claimed is:

1. An eyelid detection device that detects positions of upper and lower eyelids from a face image, wherein
the positions of the upper and lower eyelids are detected on the basis of a direction of a face that is estimated by fitting feature points of the face detected from the face image to a three-dimensional face model,
an upper and lower eyelid curve model which is estimated from the direction of the face is fitted to an edge image in which an edge of the face image is enhanced to detect the positions of the upper and lower eyelids, and
a detection angle range of the upper and lower eyelids in an up-down direction is limited on the basis of the direction of the face during driving.

2. The eyelid detection device according to claim 1, wherein, when the direction of the face is an upward direction, an upper limit angle of the upper eyelid is less than that when the direction of the face is a front direction.

3. The eyelid detection device according to claim 1, wherein, when the direction of the face is a downward direction, a lower limit angle of the upper and lower eyelids is more than that when the direction of the face is a front direction.

* * * * *